May 27, 1958  F. A. KURKA  2,836,429
TRAILER FRAME
Filed Feb. 19, 1957  2 Sheets-Sheet 1
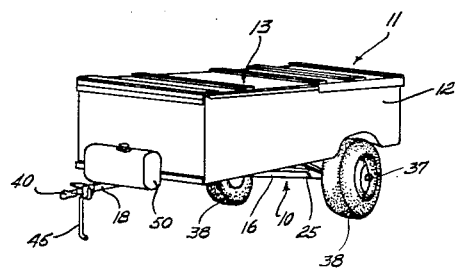
Fig. 1
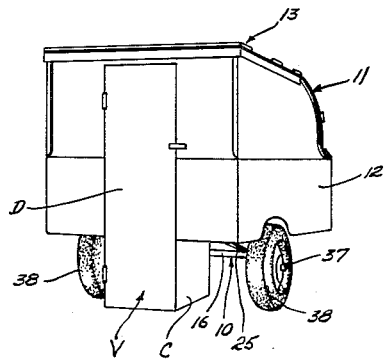
Fig. 2
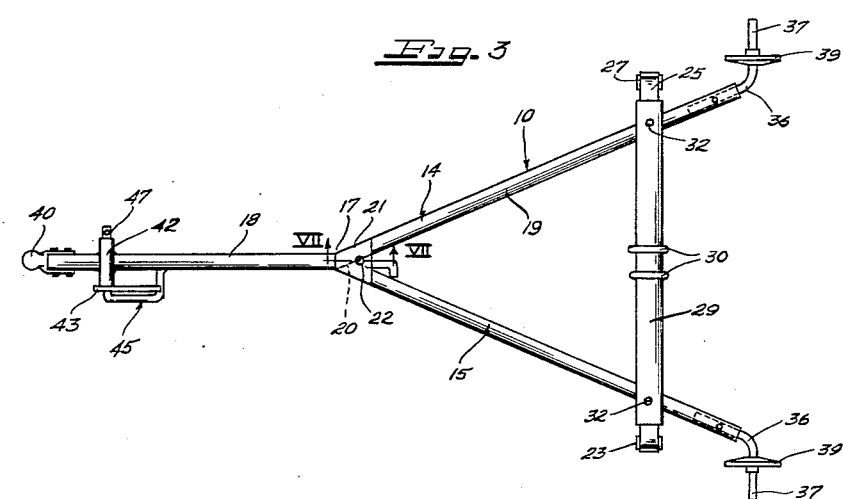
Fig. 3
Fig. 4
Fig. 5
Inventor
FRANCIS A. KURKA May 27, 1958  F. A. KURKA  2,836,429
TRAILER FRAME
Filed Feb. 19, 1957  2 Sheets-Sheet 2
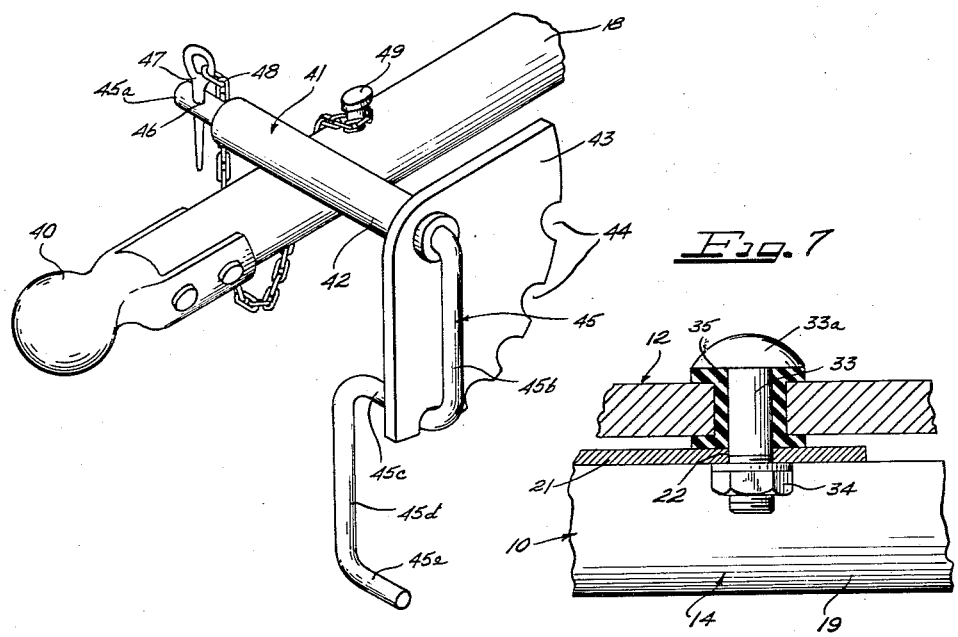
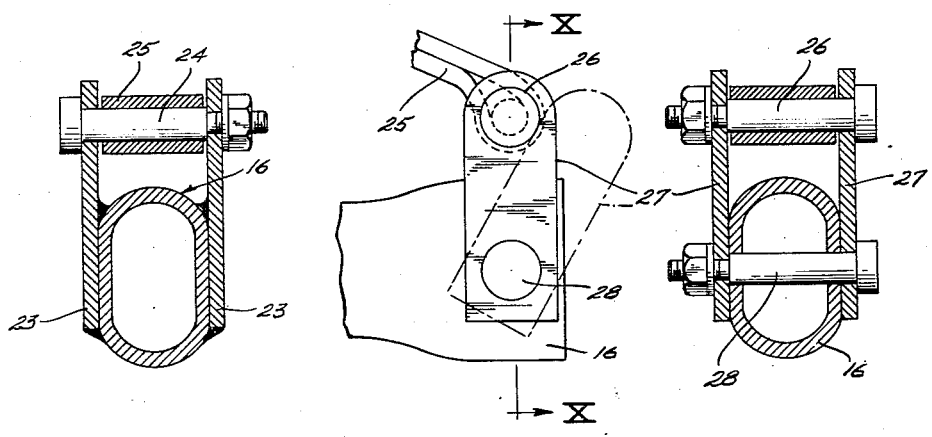
Inventor
FRANCIS A. KURKA
by
Attys.

though mounted on the shackle bolt 28 extending through the other end of the tube 16. As shown
United States Patent Office 2,836,429
Patented May 27, 1958

2,836,429

TRAILER FRAME

Francis A. Kurka, Wauconda, Ill.

Application February 19, 1957, Serial No. 641,092

6 Claims. (Cl. 280—29)

This invention relates to a frame for trailers and the like which has a sulky-like trailing action. Specifically, this invention deals with a trailer frame of generally A-shape with a pivot mounting at the apex thereof, wheels at the base thereof and a transverse spring overlying the cross-leg thereof whereby exceptional trailing action is assured while providing a spring support for the trailer body.

According to this invention, there is provided an inexpensive A-frame for vehicle bodies having wheels at the ends of the legs, a transverse spring overlying the cross-bar in spaced relation forwardly from the wheels, a pivot support at the apex of the frame, a forwardly projecting tongue beyond the apex, and a swing stand carried by the tongue and adapted to coact with the wheels to support the frame and any body thereon at a desired level.

The frame construction of this invention is especially adapted for trailers of the type disclosed and claimed in my co-pending application Serial No. 418,293, filed March 24, 1954, now U. S. Patent 2,783,079, dated February 26, 1957. As disclosed in that application, a trailer body carries a swingable door and compartment adapted to be extended in an upright position to provide a dressing chamber at the rear end of the trailer when the trailer is opened up for use. This box-like construction, being swingable from a position level with the trailer bottom to a position extending from the trailer bottom to the ground, cannot be obstructed by any frame or wheel suspension under the trailer body. The present invention now provides a suitable supporting frame and wheel suspension which not only is clear of the path of movement of the box-like door-equipped section but is also arranged to provide an improved sulky trailing action and a suspension between the frame and the trailer body. The frame of this invention departs from the conventional vehicle frames in that it is only connected to the vehicle body by a front end pivot connection and a rear spring connection.

It is then an object of this invention to provide a sulky-type frame for vehicle trailers.

Other and further objects of this invention will be apparent to those skilled in this art from the following detailed description of the annexed sheets of drawings which, by way of a preferred example, illustrate one embodiment of the invention.

On the drawings:

Figure 1 is a front perspective view of a collapsible trailer in closed or folded position equipped with a frame construction of this invention.

Figure 2 is a rear perspective view of the trailer of Figure 1 showing the trailer in unfolded or opened up condition.

Figure 3 is a top plan view of the trailer frame of this invention.

Figure 4 is a side elevational view of the frame of Figure 3.

Figure 5 is a cross-sectional view, with parts in elevation, taken along the line V—V of Figure 4.

Figure 6 is a perspective view, on an enlarged scale, showing the details of the swing stand construction on the tongue of the frame.

Figure 7 is a cross-sectional view taken generally along the line VII—VII of Figure 3 but illustrating the pivot stud as mounted in the body of the trailer.

Figure 8 is an enlarged cross-sectional view along the line VIII—VIII of Figure 5.

Figure 9 is an enlarged elevational view of the right-hand end of the spring assembly of Figure 5 and illustrating the swinging of the spring shackle.

Figure 10 is a cross-sectional view taken along the line X—X of Figure 9.

As shown on the drawings:

The trailer frame 10 is illustrated in Figures 1 and 2 as supporting a collapsible trailer body 11 of the type disclosed and claimed in my aforesaid application Serial No. 418,293, filed March 24, 1954. This collapsible trailer includes a generally rectangular-shaped box-like body 12, a foldable collapsible top section generally designated at 13 and a rear vestibule section V having a door D and a box-like bottom compartment C. The vestibule section V is swingable from the horizontal traveling position in the trailer body shown in Figure 1 to the upstanding vertical position of Figure 2 with the bottom compartment C resting on the ground. The door D gives entrance to the interior of the trailer body with its extended top and since the box-like section C must extend inwardly from the rear end of the body 12, it cannot be obstructed by any wheel suspension or frame. Thus, the frame 10 of this invention is especially adapted for the type of trailer illustrated in Figures 1 and 2.

The frame 10, as best shown in Figures 3 to 5, is preferably built up from three tubes 14, 15, 16. The tube 14 is bent at 17 to provide a forwardly extending tongue 18 and an outwardly and downwardly extending leg 19. The tube 15 is welded at its front end to the front end of the leg portion 19 at the bend 17 as shown at 20 and extends downwardly and outwardly from the leg 19 in diverging V-shaped relation. A plate 21 is welded to the front end of the tube 15 and the front of the leg 19 over the welded joint 20. This plate has a stud aperture 22 therethrough.

The cross-tube 16 has notched recesses 16a receiving the tubes 14 and 15 inwardly from the divergent ends of the tubes and projects transversely across the gap between the tubes and extends beyond the tubes as best shown in Figure 5. The tubes are welded together at the recessed areas 16a.

A generally A-shaped frame with a forwardly projecting tongue at the apex is thereby provided and with the A-frame portion extending downwardly from the tongue or apex.

One end of the cross-tube 16 has a pair of ears 23 welded to the sides of the tube as best shown in Figures 5 and 8. These ears project upwardly above the tube in spaced parallel relation and are apertured to receive a shackle nut and bolt assembly 24 therethrough. One end of a leaf spring 25 is pivotally mounted on the shackle bolts 24 and extends between the ears 23. The other end of the leaf spring, as best shown in Figures 5, 9 and 10, receives a shackle bolt 26 therethrough and the ends of this bolt are carried by shackle plates 27 which are swingably mounted on a shackle bolt 28 extending through the other end of the tube 16. As shown in Figures 8, 9 and 10, the ends of the tube 16 receiving the ears 23 and the shackle plate 27, are flattened to provide flat faces against which the ears and plates can bear. The plates 27 are capable of swinging as shown in Figure 9 to accommodate flexing of the spring but the bolt 24 and fixed ears 23 hold the other end of the spring in fixed relation to the frame so that a side sway cannot occur.

A channel beam 29, shown in Figures 3, 4 and 5, receives the central portion of the leaf spring 25 within the channel thereof and U-bolts 30 embrace the central portion of the channel beam 29 and carry a bottom plate 31 underlying the central portion of the spring to lock this central portion to the channel beam in non-slipping relation while, at the same time, accommodating flexing of the spring leaves.

The outer ends of the channel beam 29 carry upwardly projecting studs 32.

The spring 25 is so arched and of such stiffness as to carry the channel beam 29 at about the same level as the plate 21 when loaded by the trailer body. The studs 32 are secured in the bottom of the trailer body 12. The beam 29 is thereby fixed to the trailer body.

As shown in Figure 7, the aperture 22 of the plate 21 receives a stud 33 therethrough and a nut 34 on this stud 33 underlies the plate 21.

The bottom of the trailer body 12 has an aperture lined with a rubber bushing 35 and this bushing has end flanges of appreciable thickness overlapping the mouth of the aperture. The head 33a of the stud overlies one flange of the bushing and the plate 21 overlies the other flange of the bushing. This rubber bushing 35 accommodates limited tilting and rotation of the stud so that the frame 10 can swing and tilt relative to the body 12.

Thus, the stud 33 provides a pivot connection to the trailer body at the apex of the A-frame while the legs of the A-frame are connected to the trailer body through the transverse leaf spring.

The ends of the legs of the A-frame project beyond the spring connection and receive rods 36 therein. These rods can be bolted, welded or otherwise integrally united to the tubes 14 and 15 and project out of the rear ends of these tubes. The rods are bent to extend outwardly from the tubes in transverse aligned relation and carry wheel axles 37 at their outer ends. Wheels 38 are rotatably mounted on these axles 37. Backing plates 39 for the wheels can be provided on the rods.

As shown in Figures 1 and 2, the wheels 38 on the axles 37 are disposed rearwardly of the cross-tube 16 and spring 25. The wheels can extend into recesses provided in the trailer body 12 and are spaced outwardly from the box-like compartment C.

The front end of the tongue portion 18 has a trailer hitch 40 thereon for connection to an automobile bumper or the like and immediately behind this hitch there is mounted a tilt stand 41 including a tube 42 extending transversely across the tongue 18 and welded thereto as best shown in Figure 6. One end of the tube 42 has a plate 43 welded thereon with an arcuate periphery equipped with notches 44. A rod 45 has a horizontal leg 45a extending through the tube 42 in rotatable relation. The end of the leg projects beyond the tube and has an aperture 46 receiving a pin 47 which is connected to a chain 48 to a mounting post 49 on the tongue 18. The rod 45 has a portion 45b overlying the plate 43 and in right angular relation to the leg 45a. The other end of this leg 45b merges into a leg 45c extending under the leg 45a and adapted to seat in a notch 44 of the plate. This leg 45c in turn merges with a long leg 45d in right angular relation and this long leg terminates in a foot 45e.

When the pin 47 is removed from the aperture 46, the leg 45b of the rod 45 can be pulled outwardly from the plate 43 to remove the leg 45c from a notch 44. The rod can then be swung into alignment with any selected notch 44, pushed back toward the plate 43 to seat the leg 45c in the selected notch and to project the leg 45a beyond the tube 42. Replacement of the pin 47 will then lock the rod to the plate since the leg 45c can then not be removed from the selected notch. In this manner, the front end of the trailer is supported at a desired level as shown in Figure 1 and, as shown in Figure 4, the supporting rod 45 can be swung to a carry position under the frame 10 when the trailer hitch 40 is supporting the front end of the trailer.

From the above description it will be understood that the frame 10 of this invention has the suspension spring for the trailer interposed between the frame and the trailer body instead of between the wheels and the frame. This frame also has a front end pivot connection to the trailer body and a transverse rear end spring connection to the trailer body. As a result, a very effective trailing action is obtained since the wheels are at the very ends of the frame and the apex of the frame can pivot. The spring, having one fixed end and one shackled end, can flex without, however, permitting side sway of the body.

As shown in Figure 1, the tongue 18 of the frame can carry a gas tank 50 for cooking gas or other fuel. The mounting of the gas tank on the frame avoids the necessity for a reinforced body construction and provides a convenient out of the way place for a cumbersome tank.

It will be understood that variations and modifications may be effected without departing from the scope of the novel concepts of this invention.

I claim as my invention:

1. A trailer frame comprising a metal A-shaped unit having a forwardly projecting tongue at the apex thereof, wheel axles extending outwardly from the diverging ends of the unit each carried by the rear end of a side leg of the unit, a transverse spring overlying the cross-member of the unit, a stud projecting upwardly from the apex of the unit, and a swing stand on the tongue adapted to support the front end of the frame.

2. In a trailer having a body, the improvement of a generally A-shaped supporting frame for the body having diverging legs carrying wheels at the divergent rear ends thereof, a spring disposed between said legs and the bottom of the trailer body above the cross-member of the frame, a stud at the apex of the frame connected to the bottom of the trailer body, and a forwardly projecting tongue on the frame, said frame being downwardly inclined from said tongue to accommodate the spring between the frame and the bottom of the trailer body.

3. A trailer suspension which comprises a trailer body, an A frame having a pair of diverging legs, outwardly extending axles on the divergent outer rear ends of the legs, a spring forwardly from said axles interposed between the trailer body and legs, a stud at the convergent ends of the legs connected to the trailer body in pivoted relation, a tongue projecting forwardly from the convergent ends of the legs, and a supporting stand carried by said tongue.

4. A trailer frame which comprises a tubular assembly having a generally A-shape with a forwardly projecting leg at the apex, a leaf spring overlying the cross-member of the A-frame having one end pivoted to the cross-member in fixed pivotal relation and the other end pivoted to the cross-member in swing shackle relation, the divergent outer ends of the A-frame having outturned wheel supporting axles, the apex of the A-frame carrying a stud projecting upwardly therefrom, the forward end of the tongue having a trailer hitch thereon, a tank supported on said tongue, and a swing stand carried by said tongue to cooperate with the wheels in supporting the trailer.

5. In combination with a trailer having a generally rectangular main body portion and a swingable compartment portion adapted to be positioned upright and extend to the ground from the bottom of the main body, a frame for said trailer comprising a tubular A-shaped member with a tongue projecting forwardly from the apex thereof and wheels at the divergent rear ends thereof, said wheels being spaced outwardly from the swingable compartment portion in non-interfering relation therewith, a transverse spring connecting the main body with the frame forwardly from said wheels, a stud connecting the main body with said frame forwardly from said spring, and said frame having a trailer hitch at the forward end of the tongue wheerby a sulky trailing effect will be developed through the frame to the rear wheels.

6. In a trailer frame, a first tubular member bent to provide a forwardly projecting tongue and a downwardly and outwardly projecting leg, an outwardly projecting axle carired by the rear end of said leg, a second tube welded to the first tube at the junction between the tongue and leg thereof and extending outwardly and downwardly from said leg in the same plane as said leg, said second tube carrying an outwardly projecting axle at the rear end, a cross-tube overlying the second tube and the leg of the first tube in spaced relation forwardly from said axles and welded to the leg and tube, a spring carried by said cross-tube having one end fixedly pivoted to one end of the cross-tube and the other end swingably mounted on the other end of the cross-tube, and a stud plate carried by the apex end of the frame.

References Cited in the file of this patent

UNITED STATES PATENTS 2,503,535     Yarbrough _____ Apr. 11, 1950